United States Patent
Olson (10) Patent No.: US 8,086,632 B2
(45) Date of Patent: Dec. 27, 2011

(54) CREDENTIAL MANAGEMENT

(75) Inventor: Paul L. Olson, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 11/969,944

(22) Filed: Jan. 7, 2008

(65) Prior Publication Data

US 2009/0177694 A1     Jul. 9, 2009

(51) Int. Cl.
 *G06F 17/30* (2006.01)
(52) U.S. Cl. .................. 707/781; 707/769; 713/168
(58) Field of Classification Search ............. 707/781, 707/769, 792; 713/168; 726/5
See application file for complete search history.

(56) References Cited

U.S. PATENT DOCUMENTS

| | | |
|---|---|---|
| 2002/0116634 A1 | 8/2002 | Okubo |
| 2003/0084288 A1 | 5/2003 | de Jong et al. |
| 2003/0115489 A1 | 6/2003 | Kanaishi et al. |
| 2004/0225882 A1 | 11/2004 | Ishizuka et al. |
| 2005/0065975 A1* | 3/2005 | McDonald ............... 707/104.1 |
| 2005/0130114 A1 | 6/2005 | Bantz et al. |
| 2005/0257253 A1 | 11/2005 | Ekers et al. |
| 2007/0006299 A1 | 1/2007 | Elbury et al. |
| 2007/0101413 A1 | 5/2007 | Vishik et al. |
| 2008/0178270 A1* | 7/2008 | Buss ................................ 726/5 |

* cited by examiner

Primary Examiner — Belix M Ortiz (57) ABSTRACT

A method, system and program product for managing, distributing and authenticating custom credentials such as diplomas, licenses and certifications awarded to target individuals and organizations by academic institutions, governmental authorities and professional and trade organizations. The custom credentials are authentic but prejudicial information not needed by a recipient has been removed by the target party to whom the credential applies without destroying the integrity of the credential. The custom credential is efficiently provided to an interested party along with other application forms and data without the need for the interested party to request credentials from the issuing credential source authority. Accordingly the issuing credential source authority need not respond to random requests for credentials and an interested party need not negotiate the different formats provided by the various issuing credential source authorities.

11 Claims, 6 Drawing Sheets

2007-2008    CITY-COUNTY PRIVILEGE LICENCE    10-0012345

105   All Business, Trades and Professions    Expires 06/30/2008

Subject to ordinances in force or hereafter enacted to conduct the following business:

City Tax        County Tax
                                          $30.00     Paid    $15.00    6/14/2007

STABILITY COUNSELING SERVICES
1427 Main Street
City, State 12045

Tax Collector

FIG. 6

COUNTY COMMUNITY COLLEGE
under the supervision of
State University

The Trustees of the College, By the virtue of the authority vested in them
and on the recommendation of the faculty, have conferred upon:

JANE C. DOE
the Degree
ASSOCIATE IN APPLIED SCIENCE
Nursing and have granted this diploma with all the honors, rights and privileges
appertaining thereto
Given at City, State May 1967

Chairman, Board of Trustees

President

CREDENTIAL MANAGEMENT

BACKGROUND OF THE INVENTION

1. Field of the Invention

The present invention relates generally to the field of information handling including information integrity; storage, distribution and verification of accuracy and authenticity of origin.

2. Description of Related Art

In today's information handling systems, there is no established standard for granting, managing, and authenticating credentials such as diplomas, licenses and certifications awarded to target individuals and organizations by academic institutions, governmental authorities and professional organizations. As a result, there are widely differing methods established by each school, agency and other credentialing authorities for these purposes.

Examples are insurance certificates and licenses. Often a craftsman must provide a certificate of insurance to a prospective customer and/or a license to an insurance company to support an invoice for professional services. These documents can be sent by US Postal Service, by facsimile, by e-mail and by providing them on a web site on the internet or by other direct computer to computer communication.

These methods are often inefficient, relying on manual procedures for requesting information and not providing timely information since each issuing authority may respond to the interested party at their own schedule. These methods may compromise privacy, and do not provide a means to easily integrate with other systems. Usually, interested parties needing to verify or validate credentials claimed to be held, must individually contact the credential authorities for this purpose which is a cumbersome and often manual process that may not provide timely information. In the process, the interested party is often exposed to unnecessary and possibly prejudicial information such as an applicants age, gender or race that is irrelevant to the decision that must be made by an interested party.

US20030084288 for example, discloses an identification management system. The user 700 communicates with the service provider 715 to issue a service request. The service provider 715 assesses the credential request and the information submitted by the user. After that, the service provider contacts an authority 705/710 to perform dynamic credential authentication 740, 745. The authority is the State Department, Military, Bank, Post Office etc.

US20050257253 discloses a credential issuance system such as might be used in a department of motor vehicles office or passport issuing office. The system brings together, data and a picture for example and creates a plastic card or a smart card credential and a record in a credential database at the issuing office.

US20020116634 discloses a life long learning history certifying system. The history certification center 10 is connected to certifee 50 and input 60, 601, 602 personal computer terminals via the internet. The system helps in managing, controlling, and validating personal credentials from multiple organizations. The entity requiring the certification must access the system directly and the person whose records are being investigated has little or no control over the content.

US20050130114 discloses a system for automatically causing degrees and certifications to have a value that increases, decreases, or expires in a graduated fashion based on a number of criteria, such as an automatic assessment of the degree field or area of expertise and pace of change within a particular field. Using an exponential decay function or other decreasing function, a degree's "strength" may decrease through time. A degree broker provides the degree value to employers or team assemblers upon request for a fee.

US20030115489 discloses a system where ID and password need not be entered at every web site 7 but is maintained at an authentication site 5. A web site 7 looks to the authentication site 5 for customer ID verification and personal information presumed to be information such as address, payment capability etc.

US20070006299 discloses a user name and password management system. The user name and password are referred to as credentials and they are used to control communication between a handheld device and a network of devices.

US20070101413 discloses a system that provides access to a users personal data when the requester provides a credential such as user ID and password, smart card data, biometric data etc.

US20040225882 discloses a system for maintaining qualification of an operator. The system includes a IC card or memory stick 1 that stores skill authentication data. A server 3 collects and analyzes data related to the operator such as self-learning and training sessions that the operator completes and the results are stored in the card or stick. The server 3 manages the data flow between the mobile terminal 2 and the PC 4 via network 5 or LAN 6. The operator can add new skill and/or qualification information and update the qualification level/expiration date.

SUMMARY OF THE INVENTION

The present invention provides a method, system and program product for providing an authenticated custom credential from a credential, such as a diploma or a license, claimed to be held by a target party, such as a graduate or a licensed professional, who is the target of the credential. The authenticated custom credential conveys to an interested party, personal information about a target party that is important to decisions being made by the interested party without conveying unnecessary and possibly prejudicial information that is contained in a credential issued by a school, governmental or other authority.

Through the use of a Credential Processing Warehouse (CPW), credential information from granting authorities is loaded into a central repository. Targets of credentials can create custom credential objects from this repository, which present authenticated credential information to third interested parties and may be sent directly by the target party along with other application documentation. Third parties can access the Credential Processing Warehouse on demand to verify the integrity of the credential information received from target parties.

Furthermore, the interested third party can be confident that the credential data elements have been independently created by the issuer of the credential, and are not forged or just made up by the target party. A person may claim to have taken college coursework, but a third party may want to see official transcripts from the school rather than taking the graduate target persons word for it.

For example, a target person can tell someone their drivers license number, but if they show that someone, the state issued license, the interested someone will be much more confident that the number is genuine, and, by looking at the date it was issued, the interested someone also will know if it has expired.

The instant invention gives a target party user the ability to create custom data objects that are not prolix, of random format and/or prejudicial which can be trusted by an interested recipient, without requiring that the interested recipient request the credential directly from the issuer of the credential. The target party can, for example, create trusted but redacted, official college transcripts to give to someone asking for them, by arranging in advance for the college to supply the transcript data to the Credential Processing Warehouse for processing into its separate credential elements and storage in the repository.

The elements of a credential are each of the data fields of the credential such as name of issuing authority, name of the target party, status achieved by the target party, date of the achievement, location where the status is valid, identity characteristics of the target party, tax paid and so forth.

The target party uses the system, method and program product of the instant invention to create the authenticatable custom credential objects that are sent with a job application, invoice or other communication to any interested party. The receiving interested party thereby receives the credential in a timely manner with the application.

The receiving interested party can independently authenticate the received custom credential by acting on an input request option generated by the executable portions of the custom credential object to compare integrity information contained in the custom credential object with integrity information stored at the Credential Processing Warehouse.

DETAILED DESCRIPTION OF THE INVENTION

The system of the invention provides a standardized format for identifying, specifying, establishing, maintaining, verifying and communicating credentials. It has a centralized credential repository with the ability for the target holder of the credential to create credential objects that provide authenticated credential information, and also automate the request and delivery of credentials to interested parties when needed. The system integrates credential requirements and fulfillment with overall workflow processes for job openings, applications, resumes, business opportunities and due diligence. The system also preserves investment in existing data source repositories and systems dedicated to specific credentials.

Figure 1:
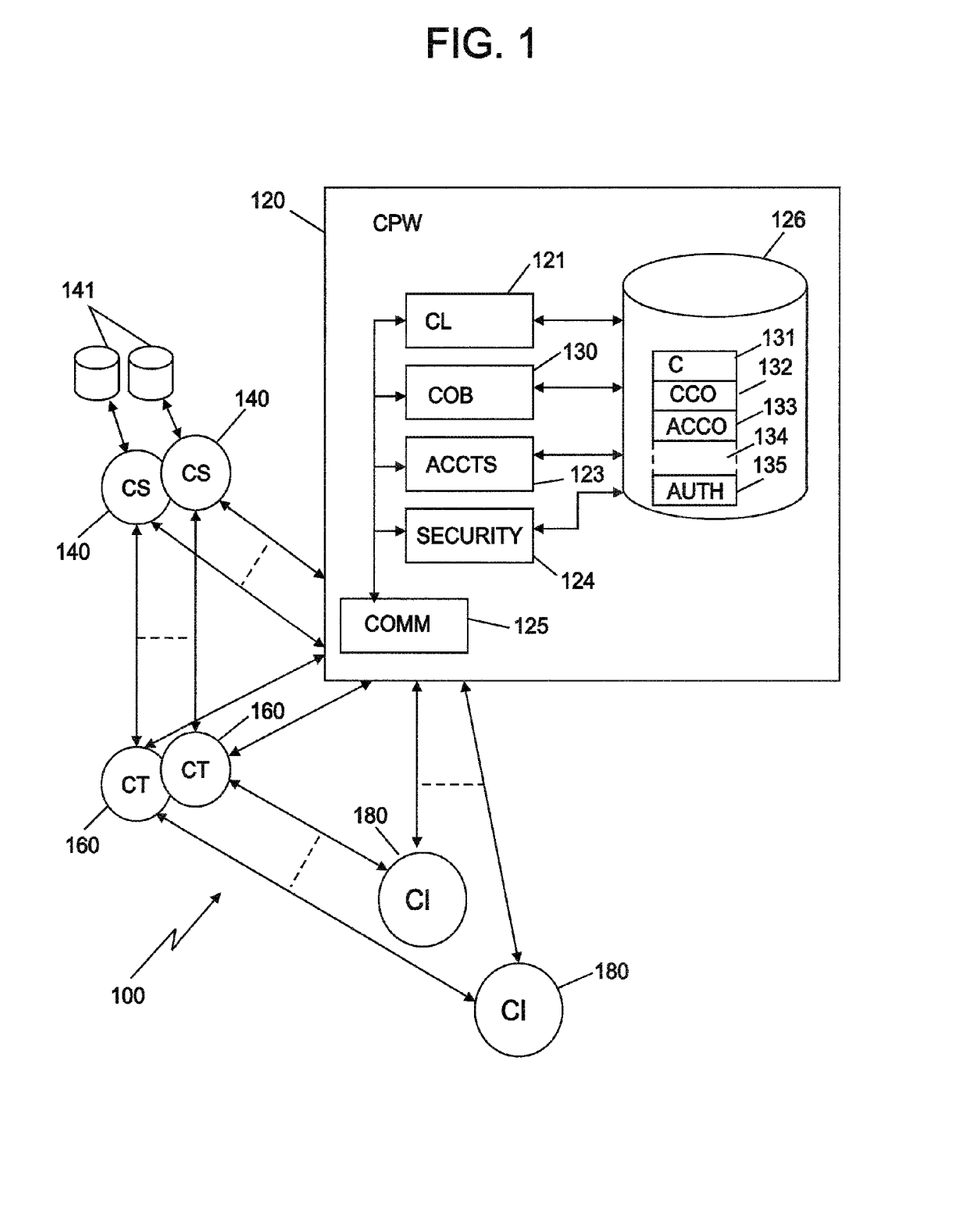
FIG. 1 is a block diagram illustrating a network wherein the invention finds utility.

Referring now to the drawings, and first to FIG. 1, the system of the present invention is embodied in a network that includes labeled blocks. The labels identify parts of the invention. The system establishes a standardized credential repository and provides associated functions including authenticated objects through a Credential Processing Warehouse 120, labeled CPW that is used to establish, securely store, manage and deliver information on credentials.

The Credential Processing Warehouse provides a central repository that supports a superset of data elements used in credentials of various types. It has Credential Loader 121 labeled CL. The Credential Loader 121 is computer logic in the form of a program product that receives input from an existing legacy credential database such as managed by a school, government agency, professional or trade organization etc. and converts this input to the format required by the Credential Processing Warehouse. The Credential Loader is preferably implemented using a business to business technology such as B2B XLM to provide a standard, automated method of supplying information from the school or government agency Credential Sources 140.

The Credential Processing Warehouse provides accounts computer logic 123 for Credential Sources, Credential Targets and Credential Inquirers to establish, access, maintain, distribute and authenticate credentials. The Credential Processing Warehouse has messaging and document exchange communicating computer logic 125 that allow the Credential Sources, Credential Targets and Credential Inquirers to send messages and documents to each other. The Credential Processing Warehouse includes security computer logic 124 that control and protect the confidentiality of credential information stored in the repository, and provide encryption used by Communicating computer logic 125 to provide security during communication if that feature is desired by the target party to whom the credential applies. In addition, the security computer logic 124 are used in signature processes that are useful to authenticate the credential information that the Credential Processing Warehouse provides in Authenticated Custom Credential Objects.

The Credential Processing Warehouse has a Credential Object Builder 130 labeled COB which is computer logic within the Credential Processing Warehouse that creates a Custom Credential Object 132 labeled CCO with the desired attributes. The Credential Object Builder 130 uses a digital signature from the Security Section 124 to authenticate the credential content of the Custom Credential Object 132 that it creates.

The Custom Credential Object 132 is computer logic that has executable portions and data that presents authenticated credential information when executed by an authorized party. Custom Credential Objects are distributed to Credential Inquirers to provide authenticated credentialing information. Custom Credential Objects may be encrypted so the confidentiality of their content is protected and restricted to authorized parties.

Referring again to FIG. 1, the system of the present invention is embodied in a network 100 that includes the Credential Processing Warehouse computer 120 that is connected to receive Credentials 131 from issuing authority Credential Source computers 140 such as departments of motor vehicles, schools, licensing agencies government agencies, professional and trade organizations and so forth. The network 100 is a public network such as the Internet/World Wide Web. The credentials are stored in data base 126

The processing warehouse computer is also connected to receive input from target party computers 160 for specifying division of credentials into their elements and input specifying the assembly of credential elements into Custom Credential Objects 132.

The processing warehouse computer 120 is also connected to transmit authenticatable Custom Credential Objects 133 to the target party computers 160.

The target party computer 160 is further connected via the network 100 to one or more interested third party Credential Inquirer computers 180 in order to transmit Authenticatable Custom Credential Objects 133. The target party computer is also connected via the network 100 to one or more issuing authorities 140 for allowing the target party to request that an updated or corrected credential be sent from the issuing authority computer 140 to the processing warehouse computer 120.

Figure 2:
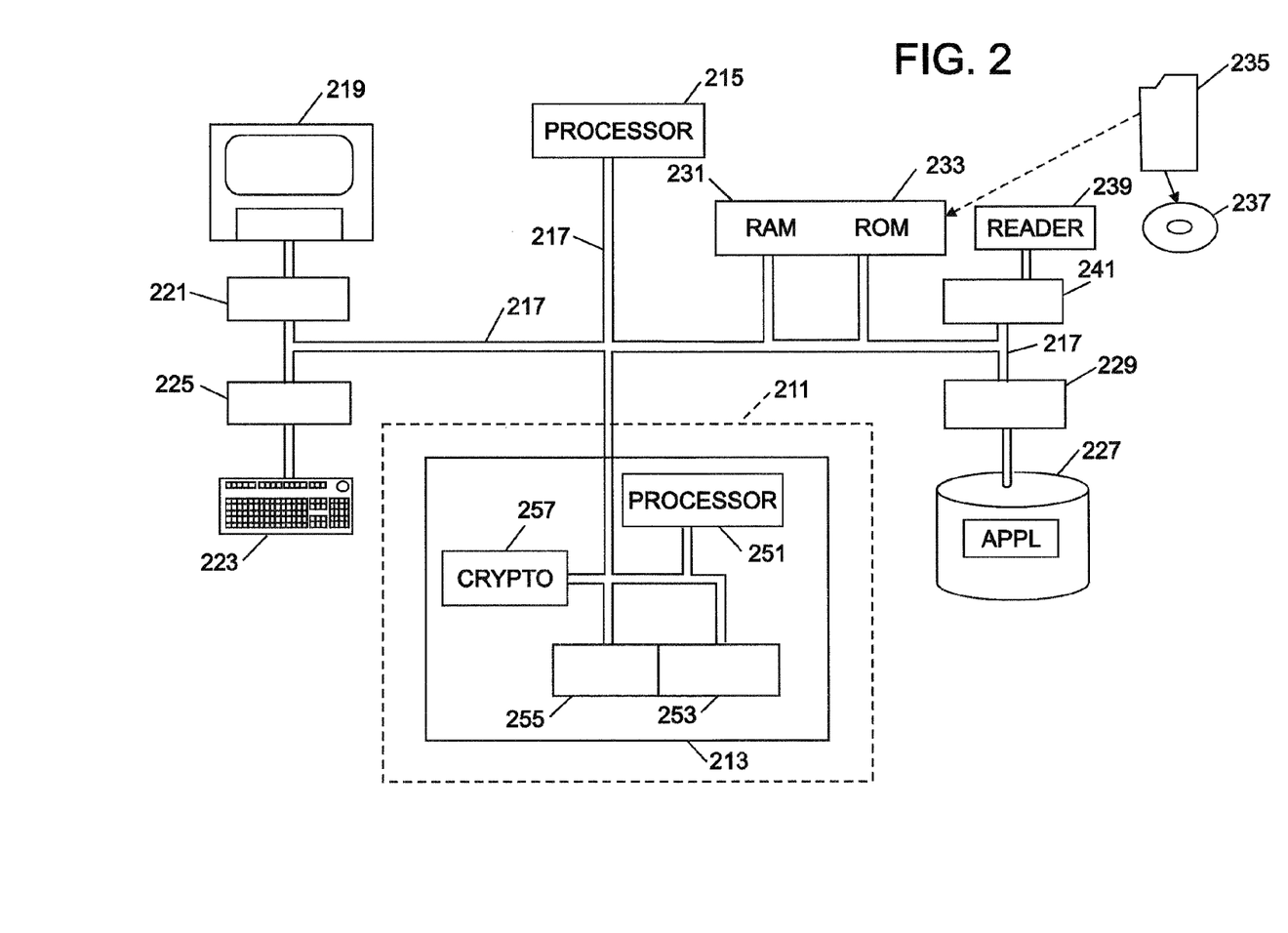
FIG. 2 is a block diagram of a computer which is used to implement the computers shown in the diagram of FIG. 1

FIG. 2 is a block diagram of a computer that may be advantageously used to embody the computers 120, 140, 160 and 180. For the purpose of describing the present invention in the context of the preferred embodiment, a typical computer architecture is shown, which represents a configuration used in many personal computers at client sites and FIG. 2 is also representative of a server computer and a database computer such as 120, 126 and 140, 141.

A processor 215 is connected to a bus 217 which comprises a set of data lines, a set of address lines and a set of control lines. A plurality of I/O devices including memory and storage devices are connected to the bus 217 through separate adapters. The I/O devices may be standard features of the computer, or plug-in options. For example, these devices may include a display 219 connected through a graphics adapter 221, a keyboard 223 connected through an adapter 225 and a hard disk drive 227 connected through adapter 229. The other devices are either included as part of the computer or are available as plug-in options. The random access memory (RAM) 231 and the read-only memory (ROM) 233 are included as standard equipment in a computer, although additional random access memory to supplement RAM 231 may be added via a plug-in memory expansion option.

As shown in FIG. 2, computer logic 235 implementing the method of the invention as shown in the remaining drawings is advantageously embodied as an article of manufacture by embedding the computer logic into compact disc 237, or other portable storage media including communication medium such as the internet 130 which is connected through adapter 259. Media 237 can be read by reader 239 connected to bus 217 by adapter 241. Further, the computer logic 235 may be embodied as a special purpose apparatus by storing the computer logic's executable instructions in RAM 231, ROM 233, or a combination of both and or in DASD 227, accessible by the processor 215 via adapter 229, for execution by processor 215.

In addition to use with the main processor 215, portions of the logic of the invention may be advantageously employed in special purpose devices such as the security card 211, also referred to as a cryptographic adapter 211, which is connected to bus 217. Again the computer logic 235 embodying the method of the invention may be implemented as a special purpose apparatus by storing the computer logic's executable instructions in RAM 253, ROM 255, or a combination of both and/or loaded into RAM 253 from DASD 227 as described above. Cryptographic adapter 211 also contains a cryptographic processing module 257 for efficiently executing algorithms such as the Data Encryption Standard (DES) algorithm and the Rivest Shamir & Adleman (RSA) algorithm as examples of available algorithms.

Operation of the Invention

Figure 3:
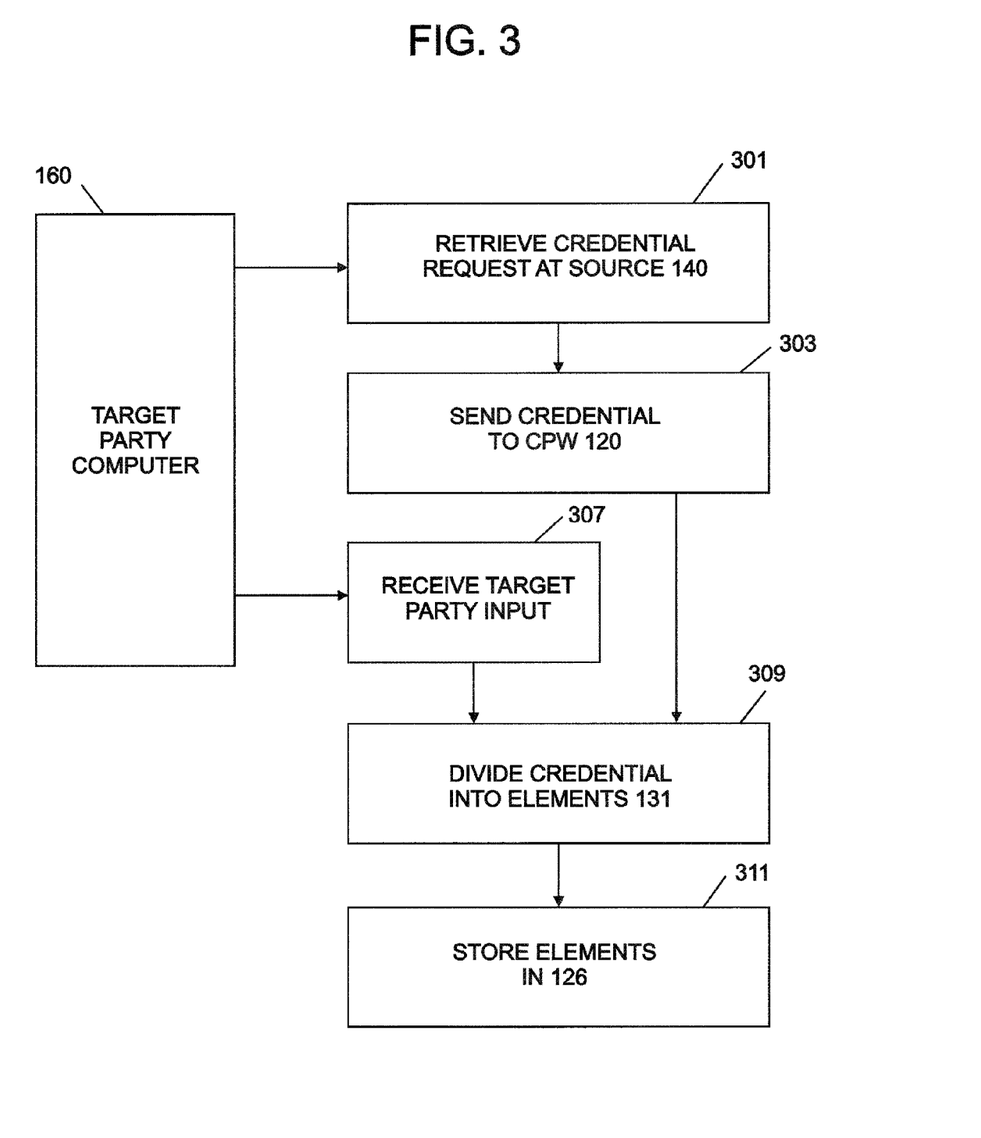
FIG. 3 is a block diagram of the steps for providing credentials to a processing warehouse and storing the credential elements.

Referring now to FIG. 3, the process of storing credentials at the Credential Processing Warehouse computer 120 will be described. The process starts with the communication 301 from the target party computer 160 to the computer 140 of the credential source. For example, a target party person such as a vehicle operator enters a request into the target party computer and sends it to the department of motor vehicles which is an example credential source. The credential source responds at block 303 by sending a copy of the requested credential information which in the case of a drivers license may include:

Issuing authority (state government)
License number
Expiration date
Name of licensee
Date of birth
Street Address
City
Zip Code
Hair Color
Eye Color
Height
Weight
Gender
Photo (image)
Signature of licensee
Vehicle class
endorsements
Restrictions (e.g., eye glasses).

In the case of a City/County Business License the data may include:
Name of business
Issuing authority (local government)
License number
Address of business
Type of business (often a locally issued code)
Tax amounts
Governmental seal
Signatures/titles
Dates—issued and/or expiration.

In the case of a State Licensed Professional, for example a trades contractor such as HVAC technician, electrician, plumber, etc. or a health professional such as a nurse, dentist, doctor, etc. or a legal professional such as attorney, notary, paralegal, etc. or other professional such as teacher, professor, etc. the data may include:
Name of licensee
Type of license
License number
Issuing authority (state government)
Governmental seal
Signatures/titles
Dates—issued and/or expiration In the case of a Technically Certified Professional that is recognized as skilled in specific technologies, products or services, the data may include:
Name (holder of certification)
Issuing authority (company or professional organization)
Type of certification
Organizational seal (optional)
Signatures/titles
Dates—issued and/or expiration.

Also in the case of a Academic Diploma or Certificate, the data may include:
Name of holder
Issuing institution
Type/description of diploma/certificate
Special recognitions such as "with honors" or "magna cum laude".
Date awarded
Institutional seal
Signatures/titles.

Figure 5:
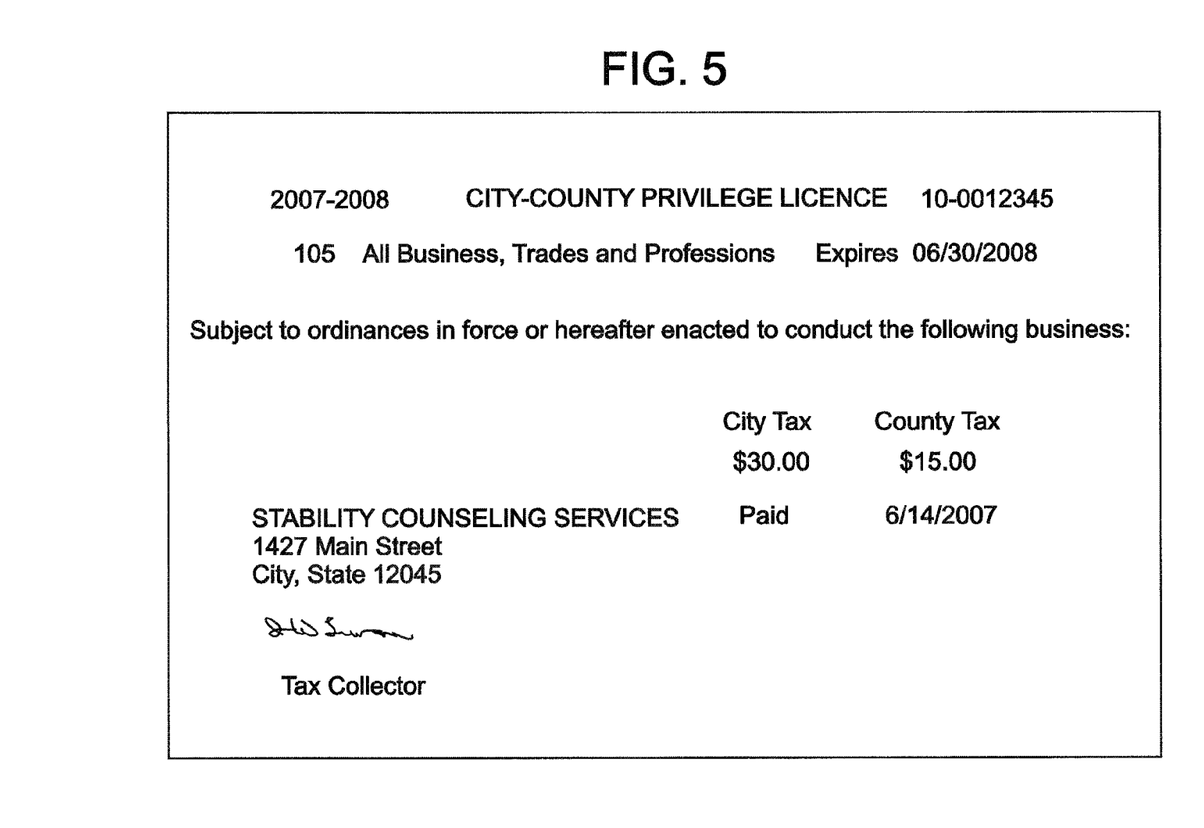
FIGS. 5 and 6 are sample credentials in paper form.
Figure 6:
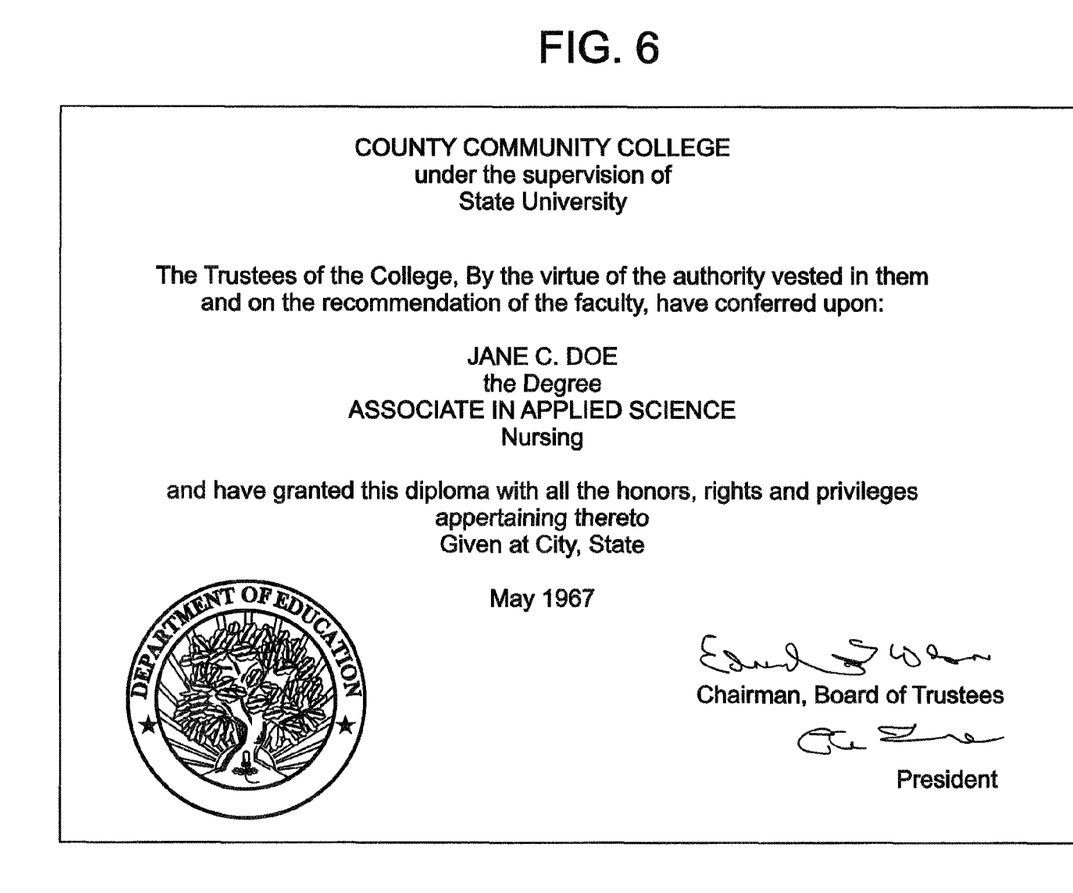

The source credential may be in any of several forms such as a facsimile image, a list of elements as shown above or a paper copy sent by US Postal Service as shown in FIGS. 5 and 6. When the credential arrives at the credential warehouse, it is processed at block 309 to separate the elements of the credential into individual fields or other form for storage and so that the credential target can provide input selecting elements for creation of a custom credential.

At block 307 this input from the target party's computer is received and in some embodiments may be used to not only select elements for creation of a custom credential but may be used to determine how the elements of a credential are to be separated. For example weight and height may be stored as a single element or it may be divided into two elements. The same may be applied to hair and eye colors.

After being divided into elements, the credential is stored with respect to the target party to whom the credential applies at block 311.

Figure 4:
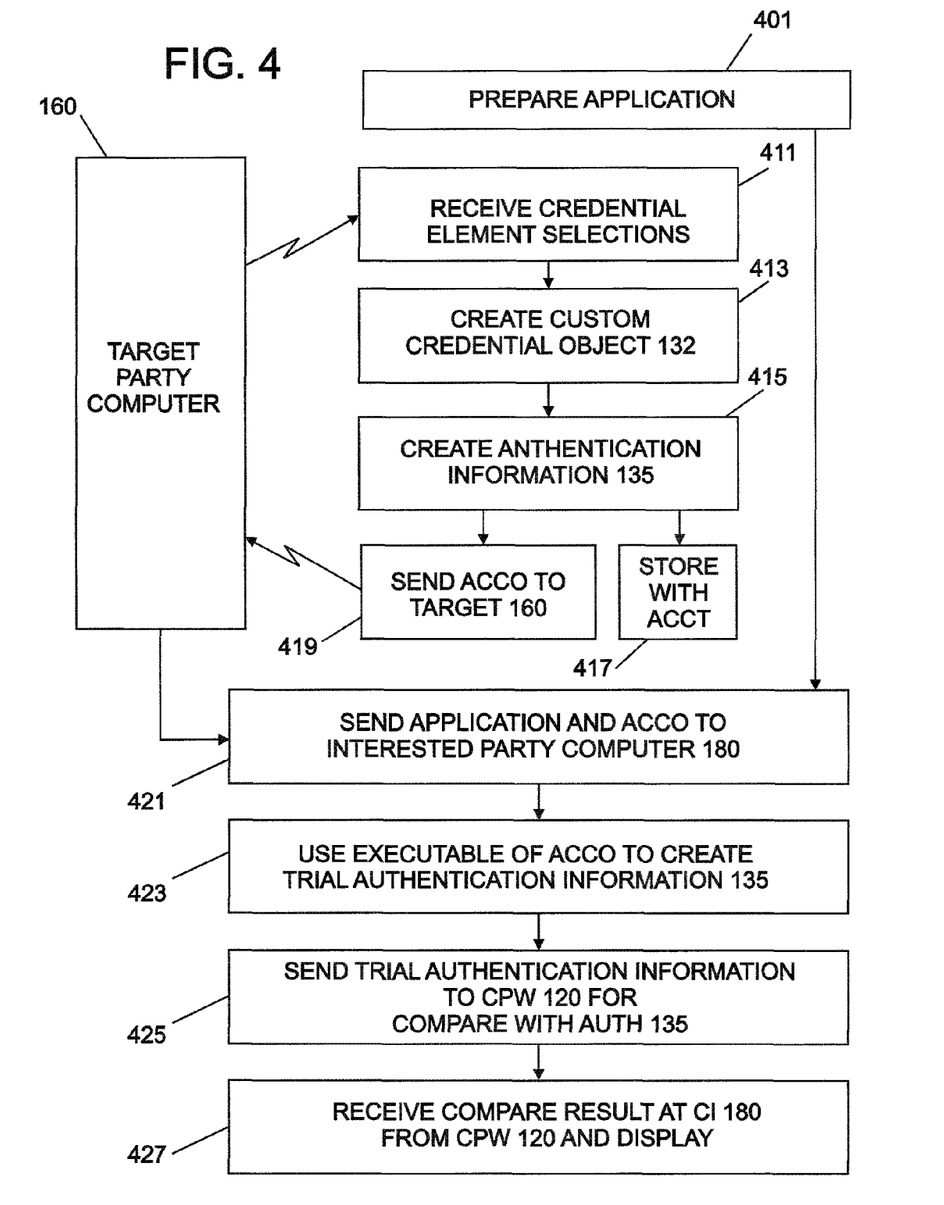
FIG. 4 is a block diagram of the steps for providing a authenticatable custom credential object to an interested third party.

FIG. 4 is a block diagram of further steps in the method of the instant invention that include providing an authenticatable custom credential to an interested party. It is important that the receiving party know that the authenticatable custom credential object that they receive is genuine, has been created by the Credential Processing Warehouse and has not been tampered with since being created. In other words there needs to be assurance of integrity.

There are numerous ways to ensure integrity. The Custom Credential Object is an object and not just data about the credential. The Custom Credential Object has associated processing instructions often called executables, which can be binary, and various codes such as check sums etc. that are added to the data when the credential is created. It would be best if the Credential Processing Warehouse created the custom credential object in a proprietary, binary format, which would deter reverse engineering, but such format can not totally prevent reverse engineering.

In the process of applying for payment, a position, or in many other commercial transactions, an application is prepared on the target party computer 160 as shown by block 401. In addition, in preparing to supply a credential as an addendum to the application, at block 411, a credential is chosen and elements of the credential are selected in a communication session with the Credential Processing Warehouse 120. The target party determines the level of concern appropriate for the commercial transaction being performed. For example, the interested party may want to see the target party's business license as shown in FIG. 5. However, the amount of tax paid by the target party is not relevant to being licensed and may be prejudicial so the target party may not wish to have that element included in an authenticated custom credential provided to the interested party. The target party also wants to be sure that the custom credential accurately does not include the tax element but still has verifiable integrity.

Toward this objective, the target party enters instructions into his computer 160 identifying the element selections to be included in one or more authenticatable custom credentials. These instructions are transmitted and received at block 411 in the Credential Processing Warehouse computer 120. At the Credential Processing Warehouse computer 120, in block 413, the instructions are used to create the Custom Credential Object 132.

At block 415, authentication information 135 is created for later use in verifying the integrity of the Authenticatable Custom Credential Object 133. The preferred embodiment uses a registered check sum to insure integrity. As shown at block 415, when the object is created by the Credential Processing Warehouse, it is registered at block 417 with other account information in the Credential Processing Warehouse accounts section 134 along with a code using check sum information from the object itself. When a recipient opens an object, they are presented with an option to authenticate the object. If they exercise this option, a trial check sum is calculated from the object and sent to the Credential Processing Warehouse. The Credential Processing Warehouse compares that trial check sum with the registered check sum stored when the object was created. If they match, the recipient can be confident that the object has not been tampered with since its creation by the Credential Processing Warehouse. It will be recognized that it is unimportant where the trial checksum is compared with the original. It can be done at the warehouse or at the recipient location.

At block 419 the authenticatable custom credential is sent to the target party for verification that it accurately presents the elements that the target party wish to provide to an interested party and for inclusion in the application being sent to the interested party. If the target party decides to change the custom credential, the target party enters revised instructions into the target party computer 160 and transmits them to the Credential Processing Warehouse computer 120 at block 411. At blocks 415, 417 and 419, a revised authenticatable custom credential is created and again transmitted to the target party's computer 160.

When the target party is satisfied that the Custom Credential Object is satisfactory, the target party, at block 421, sends the prepared application and one or more of the Authenticatable Custom Credential Objects to an interested party. Examples are a license and a diploma. The interested party, upon receipt of the application may then Verify the integrity of the credential accompanying the application as shown at block 423.

When a recipient opens an Authenticatable Custom Credential Object, the recipient party is presented with an option to "authenticate" the Object. If this option is exercised, a trial check sum is calculated and sent by the executable portion of the object to the Credential Processing Warehouse at block 425. The Credential Processing Warehouse compares that trial check sum with the check sum stored when the Object was created. The result of the comparison is returned to the interested party at block 427 for display to the interested party. If they match, the recipient can be confident that the object has not been tampered with since its creation by the Credential Processing Warehouse. Again, it will be recognized that it is unimportant where the trial checksum is compared with the original. It can be done at the warehouse or at the recipient location.

From the foregoing, it may be seen that the present invention overcomes the shortcomings of the prior art described above under the heading of Background. In particular, the invention allows efficient transmission of credentials of high integrity along with the application or other commercial transaction, without requiring that the interested party recipient contact the credential source or the central warehouse independently with the resultant delay and the need to become familiar with the processes for retrieval at these locations.

The integrity of the transmitted credential is easily verified by the recipient by merely activating a link or other communication and the executable code of the object will obtain the original authenticity information from the warehouse for comparison with the trial information obtained by calculation from the credential as received.

Having described the system, apparatus and method of the invention, it will be understood by those skilled in the art of computer systems that many additional modifications and adaptations to the present invention can be made in both embodiment and application without departing from the spirit of this invention. For example, although the invention has been described with respect to certain applications, the invention is applicable to other uses where a timely presented credential is important. Also while the preferred embodiment authenticates the integrity of a custom credential by use of a checksum compared at the Credential Processing Warehouse, it will be recognized that various other methods can be employed, including signatures and other encryption based methods, using the ability to embed binary executables within the object. Accordingly, this description should be considered as illustrative of the present invention which provides for the creation of custom credentials and distribution of custom credential objects and not in limitation thereof.

What is claimed is:

1. A method to provide an authenticated custom credential from a credential issued to a target party comprising the steps of:
   receiving at a processing warehouse, credentials issued to the target party by issuing authorities;
   receiving at the processing warehouse, input from the target party;
   using the received input at the processing warehouse, to divide a received credential into elements;
   storing the elements at the processing warehouse for later selection by the target party for incorporation into a custom credential object;
   receiving input at the processing warehouse from the target party identifying selected elements of one or more credentials for incorporation by an object builder at the processing warehouse, into a custom credential object;
   processing the custom credential object at the processing warehouse, to create an authenticatable custom credential object;
   providing the authenticatable custom credential object to the target party for recovery of the custom credential and review of the accuracy and currency of the credential elements contained in the custom credential before forwarding the authenticatable custom credential object to a party requiring the credentials of the target party.

2. The method of claim 1 further comprising the steps of:
   requesting at the target computer, that an updated credential be provided to the processing warehouse by an issuing authority when the target party determines that one or more of the elements of the custom credential received from the processing warehouse is inaccurate or out of date.

3. The method of claim 1 wherein the step of processing the custom credential object at the processing warehouse, to create an authenticatable custom credential object comprises:
   creating authentication information from the custom credential object; and,
   storing the authentication information at the processing warehouse for use in authenticating a distributed copy of the credential.

4. The method of claim 1 further comprising the steps of:
   forwarding a copy of the authenticatable custom credential object to a party requiring the credentials of the target party;
   recovering the copy of the custom credential object at the party requiring the credentials of the target party.

5. The method of claim 4 wherein authenticating the custom credential object comprises the steps of:
   responding to input from the party requiring the credentials to an executable portion of the custom credential object to create trial authentication information from the custom credential object; and
   comparing the trial authentication information with the original authentication information that was created when the custom credential object was created.

6. A system to provide an authenticated custom credential from a credential issued to a target party comprising:
   a processing warehouse computer for receiving credentials issued to the target party by issuing authorities;
   at least one target party computer connected to the processing warehouse computer for receiving input from the target party;
   computer logic at the processing warehouse computer using the received input at the processing warehouse, to divide a received credential into elements;
   computer logic at the processing warehouse for storing the elements at the processing warehouse for later selection by the target party for incorporation into a custom credential object;
   object builder computer logic at the processing warehouse for receiving input from the target party identifying selected elements of one or more credentials for incorporation by the object builder computer logic at the processing warehouse, into a custom credential object;
   computer logic processing the custom credential object at the processing warehouse, to create an authenticatable custom credential object;
   computer logic at the processing warehouse for providing the authenticatable custom credential object to the target party computer of the target party;
   executable portions of the custom credential object for execution at the target computer for recovery of the custom credential to allow the target party to review of the accuracy and currency of the credential elements contained in the custom credential before forwarding the authenticatable custom credential object to a party requiring the credentials of the target party.

7. The system of claim 6 further comprising:
   communication network connection between source computers and the target computer allowing a target party to request at the target computer, that an updated credential be provided to the processing warehouse by an issuing authority when the target party determines that one or more of the elements of the custom credential received from the processing warehouse is inaccurate or out of date.

8. The system of claim 6 further comprising:
   account storage for storing the authentication information at the processing warehouse for use by the executable portion of the authenticatable custom credential object in authenticating a distributed copy of the authenticatable custom credential.

9. The system of claim 6 further comprising:
   communication network connection between the target computer and a computer of an interested party for forwarding a copy of the authenticatable custom credential object to a party requiring the credentials of the target party.

10. The system of claim 9 comprising:
    input and execution devices at the computer of the interested party for responding to an executable portion of the custom credential object requesting input from the party requiring the credentials to create trial authentication information from the custom credential object; and
    communication network connection between the processing warehouse computer and the computer of the interested party for comparing the trial authentication information with the original authentication information that was created when the custom credential object was created.

11. A program product comprising computer useable media having computer readable logic recorded thereon for providing an authenticated custom credential from a credential held by a target party comprising:

computer readable logic for receiving at a processing warehouse, credentials issued to the target party by issuing authorities;

computer readable logic for receiving at the processing warehouse, input from the target party;

computer readable logic for using the received input at the processing warehouse, to divide a received credential into elements;

computer readable logic for storing the elements at the processing warehouse for later selection by the target party for incorporation into a custom credential object;

computer readable logic for receiving input at the processing warehouse from the target party identifying selected elements of one or more credentials for incorporation by a custom object builder at the processing warehouse, into a custom credential object;

computer readable logic for processing the custom credential object at the processing warehouse, to create an authenticatable custom credential object;

computer readable logic for providing the authenticatable custom credential object to the target party for recovery of the custom credential and review of the accuracy and currency of the credential elements contained in the custom credential before forwarding the authenticatable custom credential object to a party requiring the credentials of the target party.

* * * * *